United States Patent [19]

Harris

[11] Patent Number: 5,176,036
[45] Date of Patent: Jan. 5, 1993

[54] PARALLEL SHAFT DRIVE AND INDEXING MACHINE

[75] Inventor: William O. Harris, East Cleveland, Ohio

[73] Assignee: Overton Corporation, East Cleveland, Ohio

[21] Appl. No.: 778,396

[22] Filed: Oct. 16, 1991

[51] Int. Cl.⁵ .................... B65G 47/30; F16H 27/02; F16H 53/08
[52] U.S. Cl. ...................... 74/24; 74/84 R; 74/569; 198/343.1
[58] Field of Search .......... 74/24, 84 R, 569; 198/343.1

[56] References Cited

U.S. PATENT DOCUMENTS

| 779,328 | 1/1905 | Svebilius | 74/57 |
|---|---|---|---|
| 1,177,428 | 3/1916 | Melin | 74/55 |
| 1,312,328 | 8/1919 | Johansson | 74/54 |
| 1,847,312 | 3/1932 | Seufert | 74/569 |
| 1,847,768 | 3/1932 | Kolbassief | 74/84 |
| 1,900,387 | 3/1933 | Lewis | 82/129 |
| 2,369,540 | 2/1945 | Delamere | 198/343.1 X |
| 2,441,596 | 5/1948 | Reitter | 74/57 |
| 2,560,686 | 7/1951 | Curtis | 74/820 |
| 2,579,368 | 12/1951 | Curtis et al. | 75/820 |
| 2,866,353 | 12/1958 | Ewing | 74/70 |
| 2,986,949 | 6/1961 | Lancaster et al. | 74/84 |
| 3,103,823 | 9/1963 | Aiki | 74/54 |
| 3,170,333 | 2/1965 | Umbricht | 74/84 |
| 3,199,359 | 8/1965 | Beezer | 74/55 |
| 3,232,447 | 2/1966 | Umbricht et al. | 74/820 |
| 3,850,566 | 11/1974 | Moore | 198/343.1 X |
| 4,109,548 | 8/1978 | Shinohara et al. | 74/569 |
| 4,583,728 | 4/1986 | Mathes | 271/268 |
| 4,630,493 | 12/1986 | Kato | 74/22 R |
| 4,969,368 | 11/1990 | Sekine et al. | 74/54 |
| 5,096,041 | 3/1992 | Ravenhorst | 198/343.1 |

FOREIGN PATENT DOCUMENTS

| 59-6457 | 1/1984 | Japan . | |
| 591065 | 8/1947 | United Kingdom . | |
| 884602 | 12/1961 | United Kingdom | 74/84 R |

Primary Examiner—Allan D. Herrmann
Attorney, Agent, or Firm—Thomas Hooker

[57] ABSTRACT

A parallel shaft drive controls rotational and translational movement of a driven hub. The drive is useful in indexing and other types of machines.

20 Claims, 7 Drawing Sheets

PARALLEL SHAFT DRIVE AND INDEXING MACHINE

FIELD OF THE INVENTION

The invention relates to parallel shaft drives of the type where rotation of a rotary input hub or shaft controls the motion of an output hub or shaft. Drives of this type may be used in power indexing and other types of machines.

DESCRIPTION OF THE PRIOR ART

Prior art parallel shaft indexing drives include a fixed input shaft continuously rotated by a drive member and carrying a plurality of cams which engage followers mounted on an adjacent parallel rotary shaft to rotate the adjacent shaft at a rate different than the rotational rate of the input shaft. This type of drive is useful for imparting rotary motion to the driven hub. The rotated hub is in a fixed location and does not move with respect to the input or drive hub.

SUMMARY OF THE INVENTION

The disclosed parallel shaft drives include a continuously rotated input hub or shaft and a cam drive connection between the input shaft and a parallel driven shaft to rotate the driven shaft in a controlled manner, different than the rotation of the input shaft, and also translate or move the parallel driven shaft toward and away from the input shaft during each rotation of the input shaft. In this way, the motion of the input shaft is varied in two degrees of freedom, each motion being dependent upon the geometry of cams on the input shaft. These cams may be provided with different geometries to control the translation and rotation motion of the driven shaft as required.

The disclosed parallel shaft drive may be used for a number of applications including chain drive indexing machines which provide rapid indexing of work parts between work stations with a relatively long dwell period at each work station. This desired motion is achieved by providing cams with profiles that rotate the driven hub to move a chain wrapped around a sprocket gear mounted on the driven hub at a speed in a first direction while simultaneously moving the driven hub in a direction opposite to the first direction so that the chain is dwelled for approximately one-half of the rotation of the drive hub. During dwell the motions of the chain due to the rotation of the hub and the translation of the hub cancel each other. During the remainder of the rotation of the drive hub these motions reinforce each other to very rapidly, yet smoothly, accelerate the chain and move the carrier to the next downstream work station where, during the next rotation of the drive hub, the carrier is again dwelled.

Other objects and features of the invention will become apparent as the description proceeds, especially when taken in conjunction with the accompanying drawings illustrating the invention, of which there are six sheets and three embodiments.

DESCRIPTION OF THE INVENTION

Figure 2:
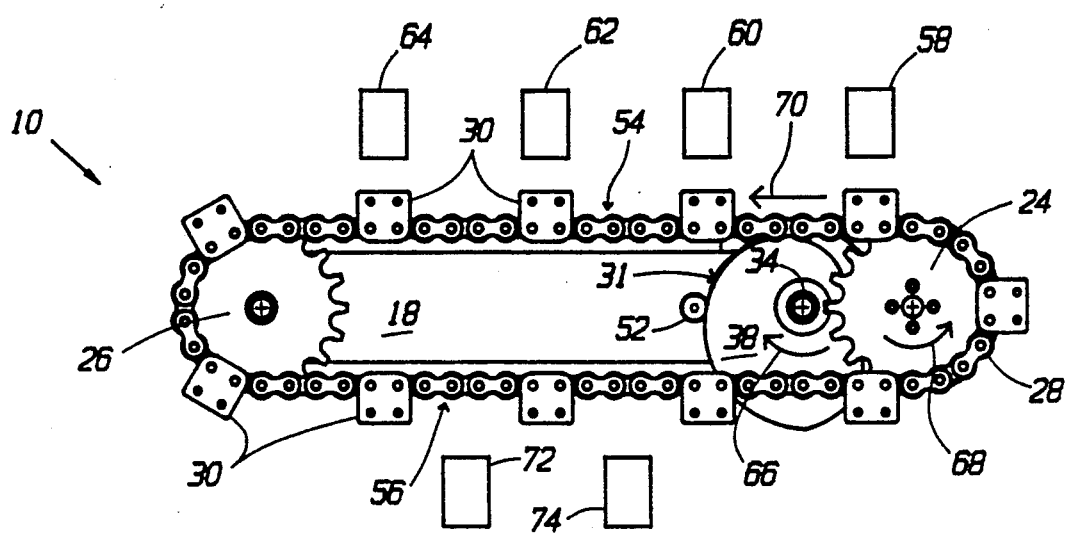
FIG. 2 is a top view of the machine of FIG. 1.

Indexing machine 10 shown in FIGS. 1-11 includes a base 12 with plate 14 mounted on the base. Longitudinal slot 16 is formed in the top of the plate and receives a slide bar 18 which is movable along the slot. Rotary indexing hubs 20 and 22 are rotatably mounted on the ends of the bar. Sprocket gears 24 and 26 are fixed on the upper ends of the hubs with indexing chain 28 fitted on the gears having runs extending along both sides of the bar. The chain carries a plurality of regularly spaced work plates 30.

Parallel shaft rotary and translation drive 31 is mounted on the plate 14 and o bar 18 and includes a fixed rotary drive hub 32 mounted on shaft 34 rotatably mounted on plate 14 and hub 20 and the follower assemblies on the hub. Shaft 34 extends through an enlarged opening in bar 18 to permit free longitudinal movement of the bar relative to the shaft. The opening is not illustrated. A portion of the shaft 34 projects below the base 12 and is connected to a rotary drive member 36. The drive member continuously rotates the shaft and hub 32.

The hub carries three circumferential cam plates 38, 40 and 42 spaced along the vertical height of the hub above the slide bar. Each plate has a continuous circumferential cam surface shaped to simultaneously rotate and translate hub 20.

Figure 4:
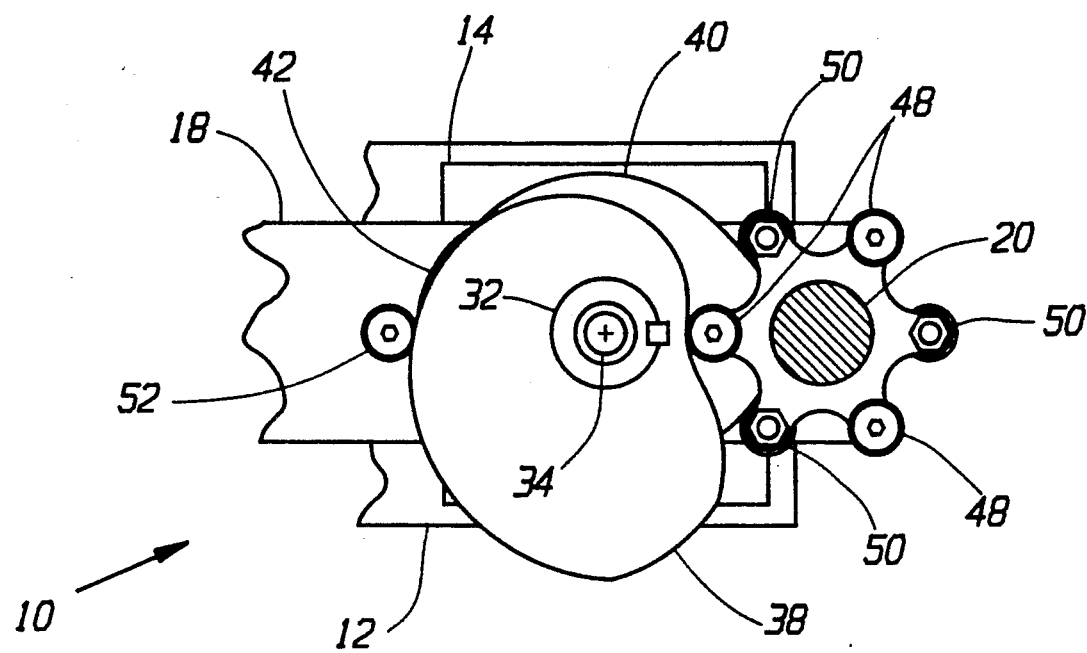
FIG. 4 is a top view of FIG. 3.
Figure 3:
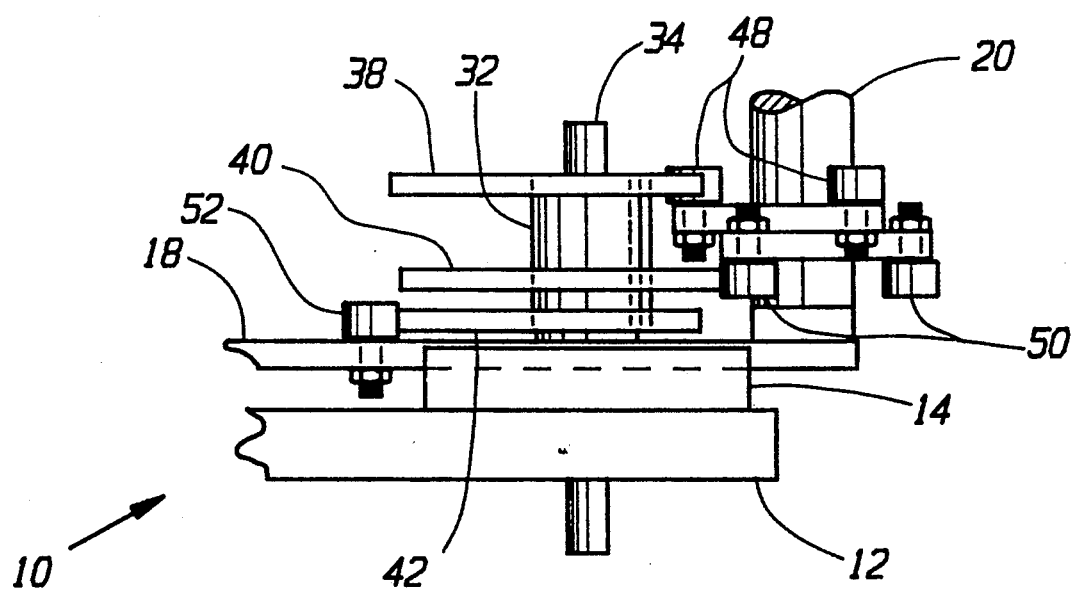
FIG. 3 is an enlarged partially broken away view of the parallel shaft drive of FIG. 1.
Figure 5:
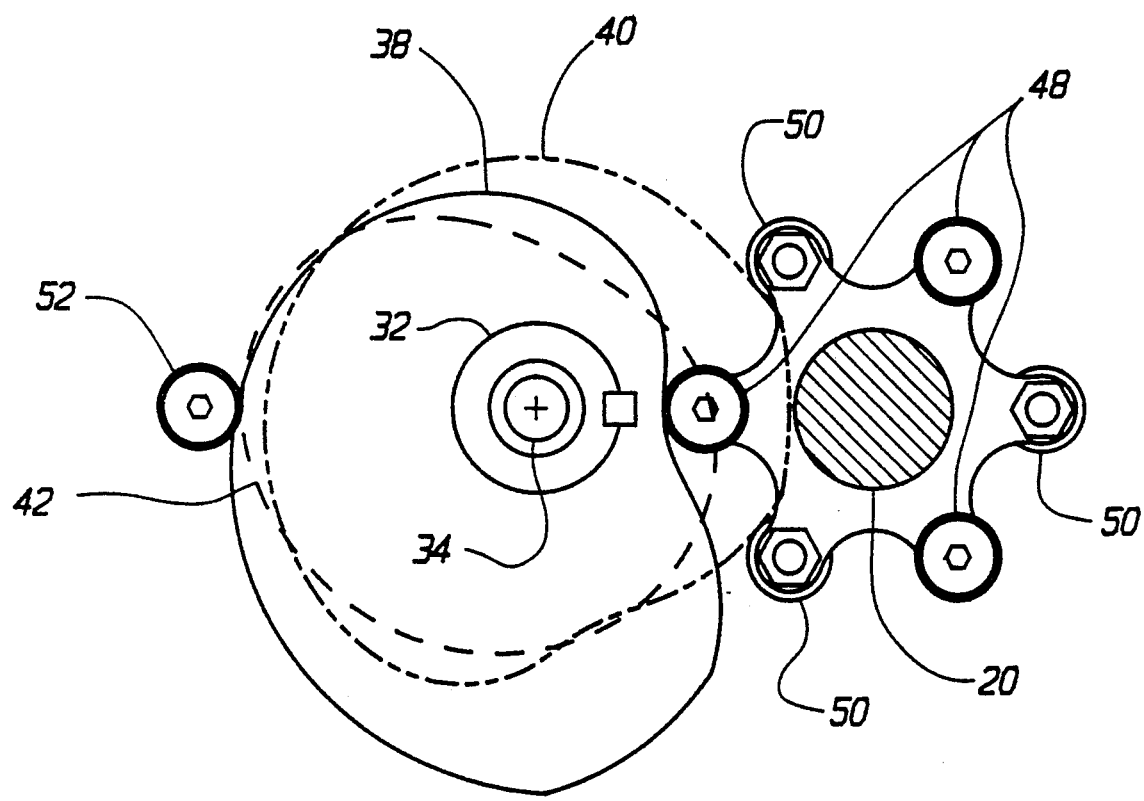
FIG. 5 is a representational top view illustrating engagement between the cams and cam followers of the drive.

Rotary hub 20, located adjacent drive hub 32 and forming part of drive 31, carries first and second cam follower assemblies 44 and 46. Assembly 44 includes three rotary cam followers 48 spaced 120 degrees apart around the axis of rotary hub 20 in position to engage the circumferential surface of uppermost rotary cam 38. Follower assembly 46 also includes three rotary cam followers 50 located below followers 48 and spaced apart 120 degrees around the rotational axis of the hub 20. As shown in FIG. 4, the followers 50 are circumferentially offset 60 degrees from followers 48 and are located between followers 48. Each of the followers 48, 50 are located equidistantly or 60 degrees from the adjacent two followers 50, 48. The followers 50 are located at a level on hub 20 to engage the circumferential surface of rotary cam 40.

A fixed rotary cam follower 52 is carried on slide bar 18 on the side of the drive hub 32 away from hub 20 and projects upwardly from the bar in position to engage the circumferential surface of the lower-most rotary cam 42. Follower 52 holds cams 38 and 40 against follower assemblies 44 and 46.

Chain 28 includes a first intermittent movement run 54 extending between gears 24 and 26 and a second continuous movement run 56 located below run 54 as shown in FIG. 2. A plurality of work stations are located adjacent the intermittent run of the chain and may include a work loading station 60 for placing individual work parts on plates 30 when dwelled opposite the station, work stations 62 and 64 located downstream of station 58 for performing operations on parts on adjacent plates 30 when dwelled at the stations and a work unloading station 58 located adjacent and upstream from station 60 for removing work parts from each plate 30 when dwelled adjacent the station. Work stations 72 and 74 may be provided adjacent the continuous movement run 56 for performing work on parts on plates 30 as they are moved past the stations.

The operation of machine 10 will now be described.

Drive 36 continuously rotates shaft 34 in a clockwise direction as indicated by arrow 66 in FIG. 2. Rotation of the drive hub 32 rotates hub 20 in a counterclockwise direction as shown by arrow 68 through engagement between the cams 38 and 40 and the cam follower assemblies 44 and 46. Cam 42 and follower 52 holds the cams 38 and 40 against their respective follower assemblies. The engagement between the cams and the assemblies also simultaneously translates the slide bar 18, hubs 20 and 22, chain and plates back and forth along the slot 16 with the result that the plates 30 on the intermittent movement run 54 of the chain 28 are successively rapidly moved to each work station 58, 60, 62 and 64 and are then dwelled at the work station for a long period of time sufficient to permit loading of a work part on a plate at station 60, performance of work operations on the work part at stations 62 and 64 and removal of the part from the plate at station 58. The chain and plates move continuously along run 56 back to gear 24. The plates 30 move the work parts past work stations 72 and 74 without dwelling.

FIGS. 6 through 11 show the operation of the parallel shaft drive 31 through one full revolution of hub 32. The respective positions of drive hub 32 and adjacent indexing hub 20 are shown every 60 degrees of rotation of hub 32. One complete revolution of hub 32 rotates hub 20 120 degrees, translates the hub 20 back and forth along slide 16 and moves each plate 30 on position along the chain. The plates on intermittent feed run 54 are dwelled during a long interval to permit operations at the stations 58, 60, 62 and 64.

Figure 6:
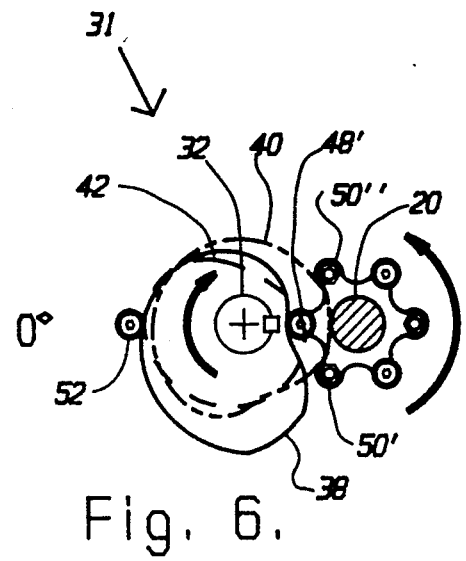
FIGS. 6 through 11 illustrate the operation of the drive.

As shown in FIG. 6 at the start of a complete rotation of hub 32 a pair of followers 50' and 50" of lower cam follower assembly 46 engage the opposite surfaces of a nose on cam 40. A cam follower 48' of the upper assembly 44 located between followers 50' and 50" engages a hollow formed in the surface of the upper cam 38. Follower 52 on slide bar 18 engages the surface of lower cam 42. In this position, the hub 20 is secured against rotation free of hub 32 by the two followers 50' and 50" which engage cam 40 to either side of the nose.

Figure 1:
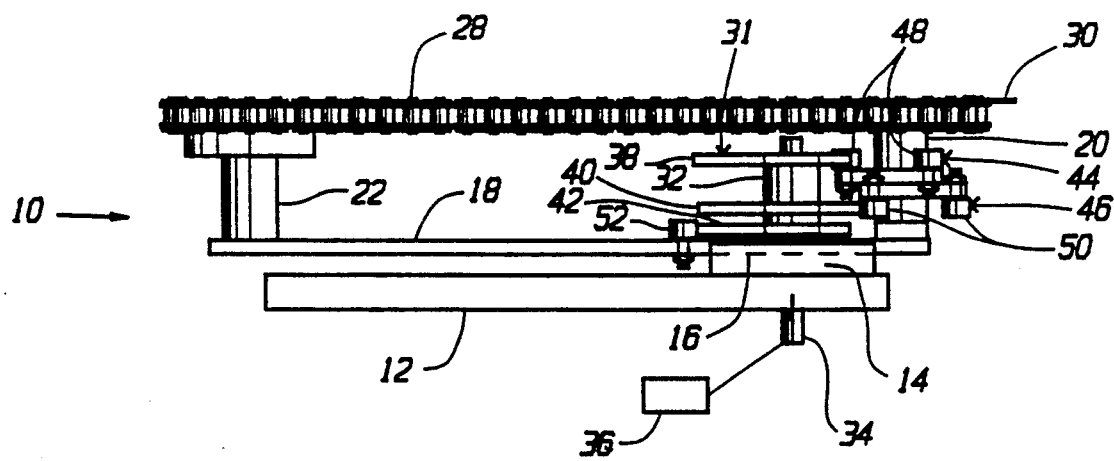
FIG. 1 is a side view of a first embodiment indexing machine with a parallel shaft drive according to the invention.
Figure 7:
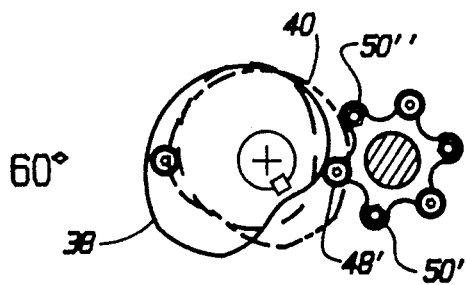

Rotation of the hub 32 60 degrees clockwise from the position of FIG. 6 to the position of FIG. 7 rotates hub 20 a small angular distance in a counterclockwise direction with the hub 20 held against rotation independent of movement of the hub 32 by single follower 50" of assembly 46 engaging the surface of cam 40 and a single follower 48' engaging the surface of cam 38. Follower 50' has been rotated out of engagement with cam 40. Follower 52 engages cam 42 to hold followers 48' and 50" against cams 38 and 40 at oppositely facing surfaces. These surfaces are equivalent to the nose of cam 40 in FIG. 6 and prevent rotation of the hub 20 in either direction independent of rotation of hub 32. Between the positions of FIGS. 6 and 7 the distance between the axies of the two parallel hubs 20 and 32 has been increased thereby translating the two sprocket gears 24 and 26 a direction to the right as shown in FIG. 1.

Figure 8:
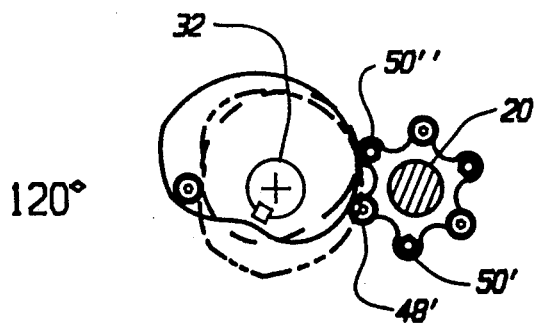

In FIG. 8 hub 32 has rotated an additional 60 degrees. Follower 52 has maintained contact between the cams 38 and 40 and the same followers 48' and 50" as engaged for FIG. 7 to rotate hub 20 through an additional small counterclockwise angle and also move the hub further away from the hub 32.

Figure 9:
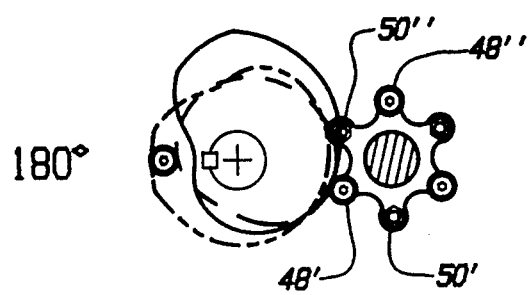
Figure 10:
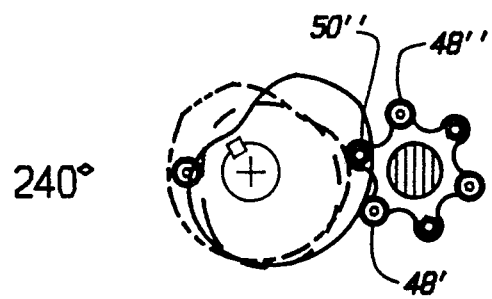
Figure 11:
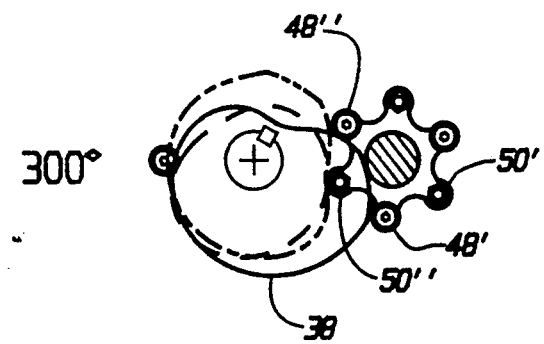

During further rotation of hub 32 as shown in FIGS. 9 and 10 follower 52 continues to maintain contact between the cams 40 and 38 and the two cam followers 48' and 50", rotates hub 20 and continues to translate hub 20 further away from hub 32. In FIG. 11, hub 32 is rotated an additional 60 degrees from the position of FIG. 10 and rapidly rotates hub 20 to bring a cam follower 48" into engagement with the surface of cam 38 prior to disengagement of follower 48' from the cam.

Continued rotation of hub 32 through an additional 60 degrees completes one 360 degree rotation of hub 32. Hub 20 has been rotated 120 degrees and translated away from and then back toward hub 32 to return the drive 31 to a position like FIG. 6. During movement of the cam hub 32 from position of FIG. 6 to FIG. 10 the hub 20 is moved away from hub 32 to move both sprocket gears 24 and 26 to the right as shown in FIG. 2. During rotation of hub 32 from the position of FIG. 10 back to the position of FIG. 6 the hub 20 is translated toward hub 32 to move the sprocket gears back to the left as shown in FIG. 2.

During each 360 degree rotation of hub 32, hub 20 is rotated through 120 degrees. Two followers always engage at least two oppositely facing cam surfaces to positively control rotation of hub 20.

Figure 12:
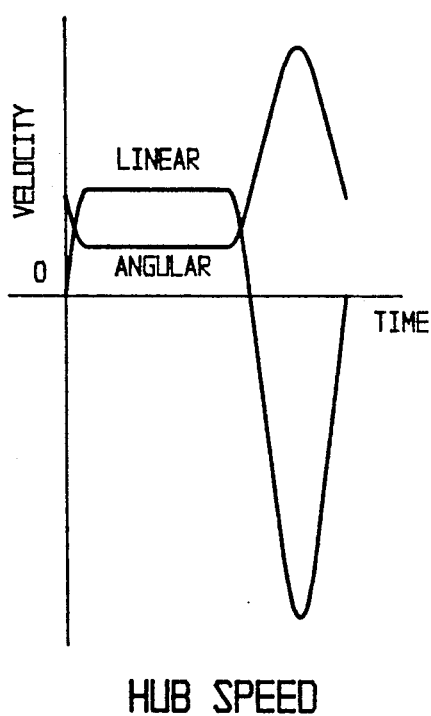

The graph of FIG. 12 shows that during approximately one half of the time of a 360 degree rotation of hub 32 the hub 20 is moved away from hub 32 at a constant linear velocity while being rotated counterclockwise at a constant angular velocity. The constant linear velocity of hub 20 moves the intermittent movement run 54 of the chain 28 to the right as shown in FIG. 2. The constant angular rotation of hub 20 and attached gear 24 move the intermittent run of the chain in a direction to the left as shown in FIG. 2. These movements are equal in speed and opposite in direction with the result that during half the time of each rotation of hub 32 the intermittent run of the chain 54 is motionless with individual work plates 3 dwelled adjacent each of the work stations 58, 60, 62 and 64. While the work plates are motionless, a work part is placed on a work plate at work station 60 for transport to the downstream work station 62 where the plate is dwelled and an operation is performed on the work part. The plate is then moved downstream to work station 64 where the plate is dwelled and subsequent operation is performed on the work part. The plate is then moved downstream to work removal station 58, dwelled and the finished product is removed from the plate.

Figure 14:
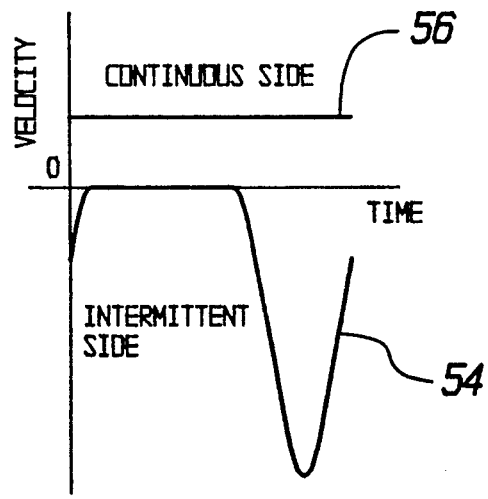

The motion of the intermittent side of the chain is dwelled during times when the linear and angular motions of hub 20 cancel each other. Both gears 24 and 26 rotate counterclockwise at a circumferential speed equal to and opposite from the linear speed at which the slide bar 18 and hubs 20 and 22 move to the right as shown in FIG. 2. FIG. 14 shows the chain speed indicating that the intermittent run 54 has a protracted dwell portion and that the continuous run 56 is moved around gears 24 and 26 at a constant velocity relative to the base and work stations.

During the portion of each rotation of hub 32 when the intermittent run of the chain is moved, the linear motion of hub 20 toward hub 32 and the rotation of hub 20 both combine to very rapidly accelerate and decelerate the chain 28 shown in FIG. 12. In this way, the plates 30 are very rapidly moved between the positions shown in FIG. 2 and are then dwelled in the shown positions for a very long period of time. Acceleration and deceleration is smooth in order to minimize inertial forces and permit high speed operation.

Figure 13:
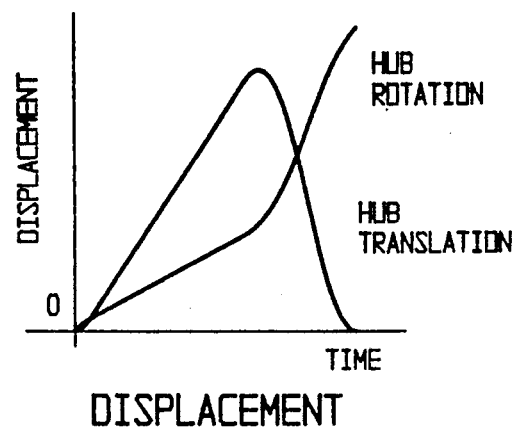
FIGS. 12, 13 and 14 are graphs representing the parameters of operation of the drive.

FIG. 13 illustrates the displacement between two hubs 2 and 32 during a full rotation of hub 32 and the rotation of hub 20 during the same interval. During the dwell sections of the curves the rotation and translation cancel out s that the upper intermittent run 54 of the chain is motionless with the plates located adjacent the work stations.

Machine 10 is used in manufacturing operations where repetitive operations need be rapidly performed on a series of work pieces. For instance, the machine may be used in the manufacture of ammunition cartridges. Individual empty cartridges can be positioned on individual plates at station 60, filled with propellant at station 62, capped at station 64, typically by affixing a projectile or bullet to the cartridge, and removed from the carrier at station 58. As another example, the machine 10 may be used to fill and cap bottles. Bottles can be placed on the plates at station 60, filled at station 62, capped at station 64 and removed to station 58.

The length of the chain 28 may be increased to provide as many stations as required for manufacturing operation along the intermittent motion run 54 of the chain. The four stations shown in FIG. 2 are merely by way of example and do not limit the invention.

Figure 15:
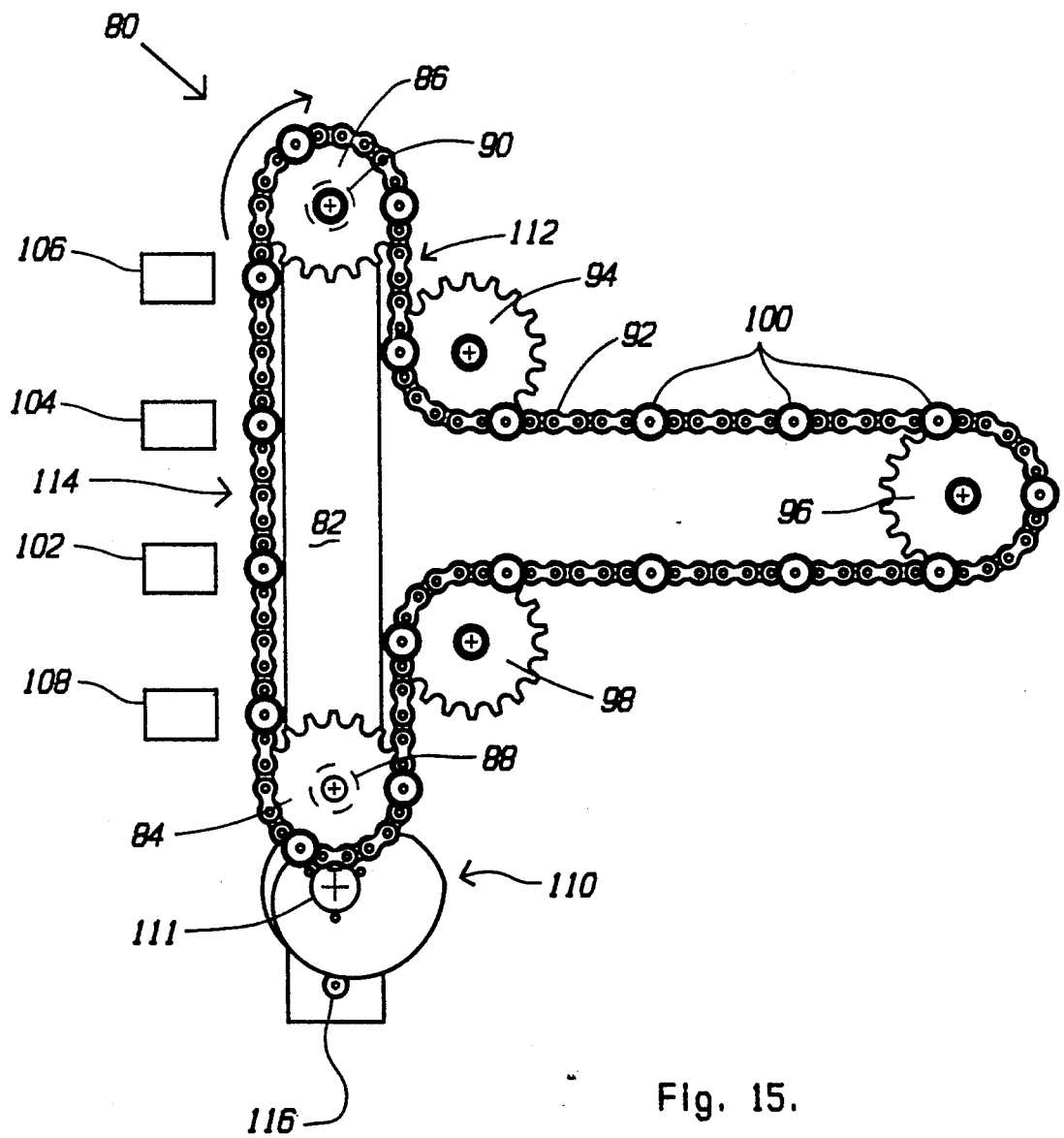
FIG. 15 is a top view of a second embodiment indexing machine.

FIG. 15 illustrates a second indexing machine 80 similar to machine 10 but with a loop of continuously moving chain to permit work parts to be maintained on the chain for a greater interval of time.

The machine includes a slide bar 82 similar to bar 18 mounted on a base (not illustrated) with a pair of sprocket gears 84 and 86 mounted on spaced locations of the slide bar and supported on rotary hubs 88 and 90. Hub 88 carries two cam follower assemblies like assemblies 44 and 46. The machine is actuated by a parallel shaft drive 110 like drive 31.

Continuous chain 92 is wrapped around sprocket gears 84 and 86 and fixed sprocket gears 94, 96 and 98 located on the continuous moving portion 112 of chain 92. Run 114 of chain 92 extending between the sprocket gears 84 and 86 is moved intermittently, similarly to run 54 of chain 28. Fixed sprocket gear 94 and 98 are located adjacent to slide bar 82 and fixed sprocket gear 96 is located a distance away from the slide bar to define two straight chain runs extending away from and then back toward the slide bar. Nest-type part carriers 100 are provided at regular intervals on chain 92.

If desired, the sprocket gear 96 may be replaced by a large diameter carousel with a portion of chain 92 to one side of slide 82 wrapped around the carousel for continuous movement of the chain, work carriers 10 and work in the carriers around the carousel.

A plurality of work stations is located adjacent the intermittent run 114 of chain 92 including a loading station 102, work stations 104 and 106 and work unloading station 108. Parallel shaft drive 110 includes a hub 111 mounted on a shaft extending through an opening in the slide bar 82. Three cams like cams 38, 40 and 42 are mounted on the hub. Two of these cams engage and rotate cam follower assemblies on hub 88 in response to rotation of hub 111 by a drive like drive 36. A fixed ca follower 116 mounted on bar 82 engages the remaining cam of drive 110 to maintain engagement between the upper two cams of the drive and the cam follower assemblies on hub 88. One full rotation of hub 111 rotates all of the sprockets 120 degrees and translates slide 82 as described in connection with operation of drive 31. As shown in FIG. 15, carriers 100 are located on chain 92 at lengths along the chain equivalent to 120 degrees when the chain is wrapped around a sprocket gear 84, 86. Accordingly, the carriers on the intermittent motion run 114 of chain 92 are indexed between adjacent work stations every 360 degree rotation of the drive 110. As in machine 10, the carriers are dwelled at the work stations for a period of time equal to approximately one-half the rotational period of drive 110. The continuous motion run 112 of chain 92 moves continuously from sprocket gear 86 around sprocket gears 94, 96 and 98 and back to sprocket gear 84 thereby providing an additional interval of time during which the work is held in carriers 100.

The machine 80 may be used in a multi-operation manufacturing operation in which work parts are loaded in stationary carriers at station 102, and indexed to a station 104 where, for instance, an adhesive may be applied to the stationary work parts. The work parts are then indexed to station 106 in which a second place work part is placed on the first work part with the adhesive holding the parts together. Further movement of the carriers around the continuous motion run of the chain maintains the work parts on the chain for an increased length of time sufficient to permit curing of the adhesive. In other assembly operations, the interval of time during which the carrier and work part move along the continuous motion portion 112 of the chain and the location of run to one side of the machine permit, for instance, melting of the work part, paint to dry or performance of other time- or location-dependent manufacturing operations.

After the work part has traveled through the continuous motion portion 112 it is brought back to and dwelled at the work unloading station 108 where the completed work part is removed from the carrier during dwell of the intermittent motion portion 114 of the chain.

Figure 17:
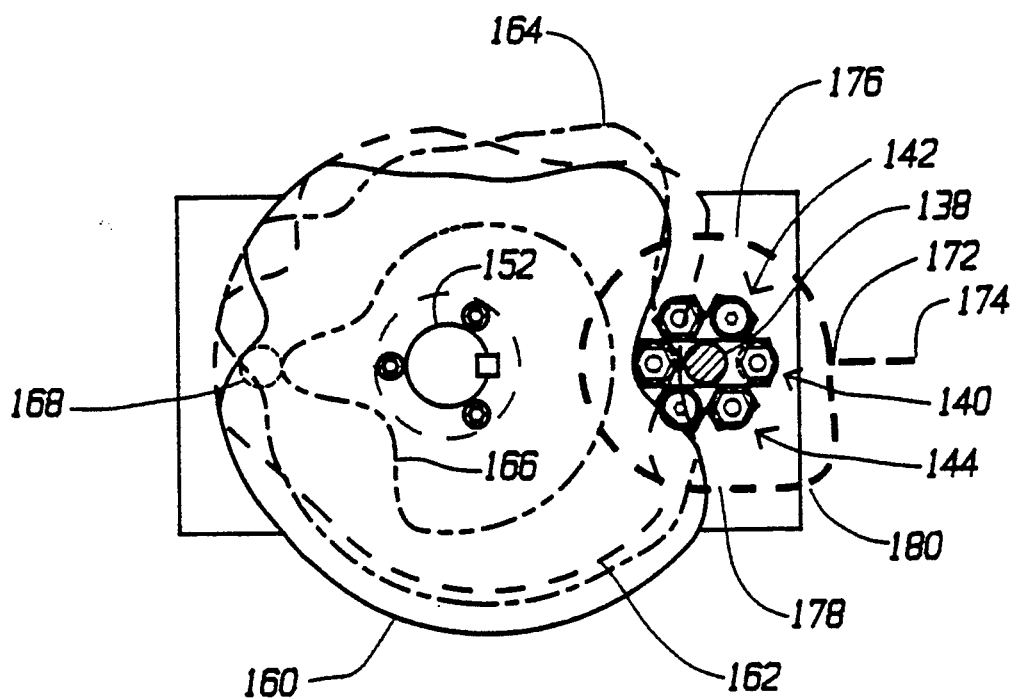
FIG. 17 is a representational top view showing the cam and cam followers used in the third embodiment drive.
Figure 16:
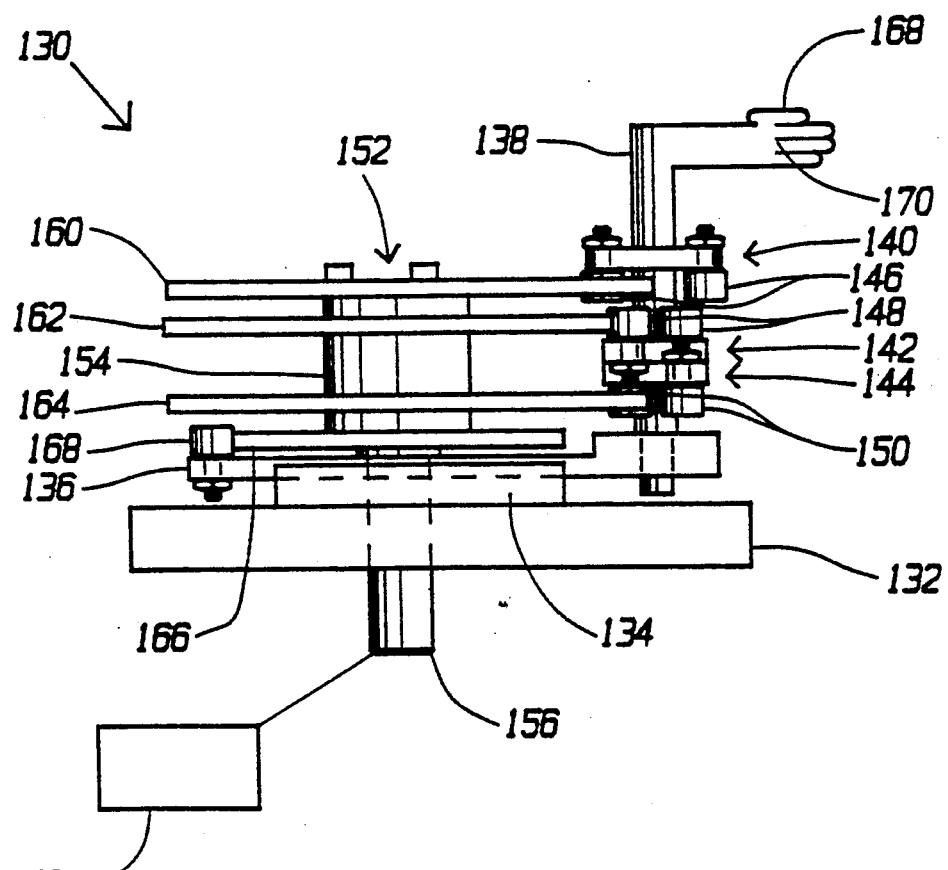
FIG. 16 is a side view of a third embodiment parallel shaft drive.

FIGS. 16 and 17 illustrate a third embodiment parallel shaft indexing drive 130. Drive 130 is similar to drive 10 but uses a different type of drive member and driven hub.

Drive 130 includes a base 132, a block 134 mounted on the base having a slot formed therein like slot 16 and an elongate slide bar 136 fitted within the slot. Rotary hub 138 is mounted on the right hand end of the slide bar as shown in FIG. 16 and includes three sets of cam follower assemblies 140, 142 and 144. Each of these assemblies includes two diametrically opposed cam followers 146, 148 and 150 mounted on like arms on the rotating hub 138. As shown in FIG. 17, the three arms are mounted on the hub at 60 degree intervals around the hub so that the cam followers of each assembly are positioned 60 degrees to either side of the cam followers of the other assemblies.

Drive 130 includes a rotary drive hub 154 having a shaft 156 extending through an enlarged opening in slide bar 136 and an end extending below the base 132. A rotary drive 158 continuously rotates shaft 156 to operate indexing drive 130.

Four rotary cams 160, 162, 164 and 166 are mounted on hub 154 for rotation with the hub by drive 158. The circumferential surface of cam 160 engages the follower rollers 146 of cam follower assembly 140. The surface of cam 162 engages the follower rollers 148 of assembly 142. The surface of cam 164 engage the follower rollers 150 of assembly 144. The surface of cam 166 engages follower 168 mounted on slide bar 136 on the side of the hub 154 away from hub 138 to hold the cams 160, 162 and 164 into engagement with the followers of assemblies 140, 142 and 144.

During rotation of the drive member 152, the cams 160, 162 and 164 rotate hub 138 and vary the distance between the two hubs to obtain the linear and angular motion. Only one follower of each of the follower assemblies engages an adjacent cam. The follower 168 engaging cam 166 assures that cams 160, 162 and 164 are maintained in engagement with followers on the adjacent assemblies on hub 138 by positively controlling the linear position of hub 138 at all times without permitting any looseness or play in the drive.

The illustrated profiles of the four cams 160, 162, 164 and 166 in FIG. 17 produce a motion of output hub 138 that is initially to the right, then back to the left, then a 270 degree counterclockwise rotation followed by a constant velocity move to the right and ending up with a simultaneous 90 degree rotation and move to the left back to the starting position. These profiles also provide smooth but rapid acceleration and deceleration of the output hub 138.

Output shaft 138 may be provided with a hand 168, representative of work part carrier, tool or other device movable by drive 130 and having a center point 170. The dashed lines 172 in FIG. 17 illustrate the path of movement of the center point through the cycle of operation of drive 130 from a starting point 172 to the furthest extended point 174, back to the starting point 172, around a 270 degree counterclockwise rotation 176 ending at point 178, movement to the right to point 180 and then back to the starting point 172.

The disclosed parallel shaft drives repetitively rotate and translate a driven hub or shaft 20, 88 or 138 in response to continuous rotation of a driven shaft. The cams mounted on the driven shaft are provided with profiles particularly adapted for use in machines where intermittent linear and rotary movement of a shaft is required in order to perform manufacturing operations. The cams may be provided with different profiles to rotate and translate the driven hub or shaft in accordance with different requirements for devices other than indexing machines including devices which do not actuate chain drives and do not include dwell periods. For instance, the driven hub or shaft may be moved and rotated according to a distance and phasing profile in a textile machine or other machines where the position of the shaft varies relative to the axis of the driven shaft and the rotational movement of the shaft must also vary according to the rotational position of the drive shaft. The disclosed parallel shaft drives permit controlled periodic movement of the driven shaft in two degrees of freedom relative to the driven hub or shaft, as contrasted to conventional parallel shaft drives which control the movement of the driven shaft with one degree of freedom.

In the disclosed parallel axis drives the driven hub or shaft is translated back and forth along a straight line path toward and away from the axis of the drive hub. Alternatively, the driven hub may be fitted in an arcuate slot so that the drive hub rotates the driven hub about its own axis and also translates the driven hub back and forth along an arcuate, as opposed to straight, path.

The disclosed chains could be replaced by belts, strands or other types of continuously indexing members. The term "chain" as used herein encompasses belts and other continuous indexing members.

While I have illustrated and described preferred embodiments of my invention, it is understood that this is capable of modification, and I therefore do not wish to be limited to the precise details set forth, but desire to avail myself of such changes and alterations as fall within the purview of the following claims.

What I claim as my invention is:

1. A drive mechanism including a rotary input shaft, a rotary output shaft, a connection permitting movement of the output shaft toward and away from the input shaft along a path, rotary cam means on the input shaft, and cam follower means on the output shaft, said rotary cam means engaging said cam follower means to both rotate the output shaft about its axis at a rate different than the rotation of the input shaft and translate the output shaft back and forth along the path during each revolution of the input shaft.

2. A mechanism as in claim 1 wherein said rotary cam means includes a cam surface dimensioned to translate the output shaft back and forth along the path once during each revolution of the input shaft.

3. A mechanism as in claim 1 wherein the cam follower means engages the rotary cam means at two oppositely facing locations.

4. A mechanism as in claim 3 wherein the path is straight.

5. A mechanism as in claim 3 including retention means for holding the rotary cam means and cam follower means together.

6. A mechanism as in claim 5 wherein said retention means includes a rotary cam on the input shaft, a support movable along the path, the output shaft being mounted on the support, and a cam follower on the support engageable with the rotary cam.

7. A mechanism as in claim 1 wherein the shafts are parallel, the rotary cam means includes a plurality of rotary cams on the input shaft and the cam follower means includes a plurality of cam follower assemblies on the output shaft with each rotary cam engaging one cam follower assembly, each cam follower assembly including a plurality of cam followers circumferentially spaced around the axis of the output shaft, and two of said followers engaging oppositely facing cam surfaces on said cams.

8. A mechanism as in claim 1 wherein the shafts are parallel, the rotary cam means includes two rotary cams on the input shaft, and the cam follower means includes two cam follower assemblies on the output shaft, each of said assemblies including three circumferentially spaced cam followers, the followers in each assembly being circumferentially located between the followers of the other assembly.

9. A mechanism as in claim 1 wherein the shafts are parallel, the rotary cam means includes three rotary cams on the input shaft and the cam follower means includes three cam follower assemblies on the output shaft, each of the cam follower assemblies including a pair of opposed followers, the followers in each assembly being circumferentially located between two followers on the other assembly.

10. A mechanism as in claim 1 including a first sprocket gear mounted on the output shaft, a chain engaging the gear and including a chain run extending away from the gear and along the path, the drive means also moving the chain run along the path in a first direction at a first speed during translation of the output shaft while rotating the output shaft to move the chain run along the path in a direction opposite to the first direction and at a speed equal to the first speed to dwell movement of the chain run.

11. An indexing machine including a drive mechanism as in claim 10, a base, said rotary input shaft being mounted in the base, a rotary drive for rotating the rotary input shaft, said connection including an elongate member movably mounted on the base for movement along the path, said output shaft being rotatably mounted on the member, a third shaft mounted on the member a distance from the output shaft, a second sprocket gear mounted on the third shaft, said chain being also wrapped around said second sprocket gear and including an intermittent motion portion extending between the gears, and work part carriers mounted at intervals along the chain.

12. An indexing machine as in claim 11 including a third sprocket gear at a fixed location, said chain being also wrapped around said third sprocket gear.

13. A parallel shaft drive including a base, a drive shaft rotatably mounted on the base, a slide bar mounted on the base for transverse movement toward and away from the drive shaft along a path, a driven shaft rotatably mounted on the bar adjacent the drive shaft, the axies of said shafts being parallel to each other, a rotary power drive connected to the drive shaft for rotation thereof, a plurality of disc-type rotary cams mounted on the drive shaft at intervals along the length of the drive shaft, each cam having a shaped continuous circumferential cam surface, a plurality of follower assemblies mounted on the driven shaft with one assembly associated with each rotary cam, each assembly including a plurality of cam followers engagable with the surface of the associated rotary cam during rotation of the drive shaft, said followers being circumferentially spaced around the circumference of the driven shaft, and engagement means for maintaining engagement between said rotary cams and said cam followers.

14. A drive as in claim 13 wherein at least two of said cam followers engage oppositely facing surfaces on said cams.

15. A drive as in claim 14 including two rotary cams on the drive shaft and two follower assemblies on the driven shaft, each assembly including three circumferentially spaced cam followers with the followers of one assembly being located circumferentially between the followers of the other assembly.

16. A drive as in claim 14 including three rotary cams on the drive shaft, three cam assemblies on the driven shaft, each assembly including two diametrically opposed cam followers with said cam followers being circumferentially spaced around the driven shaft.

17. A drive as in claim 14 wherein said engagement means includes an additional rotary cam on the drive shaft and an additional cam follower, such additional cam follower engaging the circumferential surface of the additional rotary cam.

18. An indexing machine including a parallel shaft drive as in claim 14, an end shaft rotatably mounted on the slide bar away from the driven shaft, a first sprocket gear mounted on the driven shaft, a second sprocket gear mounted on the end shaft, and a chain wrapped around the sprocket gears and including runs extending along the slide bar.

19. An indexing machine as in claim 18 including a plurality of work carrying members regularly spaced along the chain and a plurality of work stations spaced along one run of the chain, said stations including a work loading station and a work unloading station.

20. An indexing machine as in claim 19 including a fixed shaft, a third sprocket gear mounted on the fixed shaft and wherein the chain is wrapped around the third sprocket gear.

* * * * *